(12) United States Patent
Khare et al.

(10) Patent No.: US 6,826,619 B1
(45) Date of Patent: Nov. 30, 2004

(54) METHOD AND APPARATUS FOR PREVENTING STARVATION IN A MULTI-NODE ARCHITECTURE

(75) Inventors: Manoj Khare, Saratoga, CA (US); Akhilesh Kumar, Sunnyvale, CA (US); Sin Sim Tan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 886 days.

(21) Appl. No.: 09/641,708

(22) Filed: Aug. 21, 2000

(51) Int. Cl.[7] .................. G06F 15/16; G06F 15/173; G06F 11/00

(52) U.S. Cl. .................. 709/232; 709/207; 709/224; 714/2; 714/48

(58) Field of Search .................. 709/223, 224, 709/225, 226, 229, 232, 233, 234, 235, 207; 370/252, 242; 714/2, 37, 48

(56) References Cited

U.S. PATENT DOCUMENTS

| | | | |
|---|---|---|---|
| 5,434,847 A | * 7/1995 | Kou | 370/252 |
| 5,485,579 A | 1/1996 | Hitz et al. | 395/200.12 |
| 5,495,419 A | 2/1996 | Rostoker et al. | 364/468 |
| 5,535,116 A | 7/1996 | Gupta et al. | 364/134 |
| 5,541,914 A | 7/1996 | Krishnamoorthy et al. | 370/56 |
| 5,551,048 A | 8/1996 | Steely, Jr. | 395/800 |
| 5,557,533 A | 9/1996 | Koford et al. | 364/491 |
| 5,581,729 A | 12/1996 | Nishtala et al. | 395/470 |
| 5,588,131 A | 12/1996 | Borrill | 395/473 |
| 5,588,132 A | 12/1996 | Cardoza | 395/475 |
| 5,588,152 A | 12/1996 | Dapp et al. | 395/800 |
| 5,590,292 A | 12/1996 | Wooten et al. | 395/825 |
| 5,590,345 A | 12/1996 | Barker et al. | 395/800 |
| 5,594,918 A | 1/1997 | Knowles et al. | 395/800 |
| 5,603,005 A | 2/1997 | Bauman et al. | 395/451 |
| 5,613,136 A | 3/1997 | Casavant et al. | 395/800 |
| 5,617,537 A | 4/1997 | Yamada et al. | 395/200.01 |
| 5,625,836 A | 4/1997 | Barker et al. | 395/800 |
| 5,634,004 A | 5/1997 | Gopinath et al. | 395/200.02 |
| 5,634,068 A | 5/1997 | Nishtala et al. | 395/800 |
| 5,636,125 A | 6/1997 | Rostoker et al. | 364/468.28 |
| 5,644,753 A | 7/1997 | Ebrahim et al. | 395/458 |
| 5,655,100 A | 8/1997 | Ebrahim et al. | 395/471 |
| 5,657,472 A | 8/1997 | Van Loo et al. | 395/485 |
| 5,678,026 A | 10/1997 | Vartti et al. | 395/479 |
| 5,680,571 A | 10/1997 | Bauman | 395/449 |
| 5,680,576 A | 10/1997 | Laudon | 395/472 |
| 5,682,322 A | 10/1997 | Boyle et al. | 364/491 |
| 5,682,512 A | 10/1997 | Tetrick | 395/412 |
| 5,684,977 A | 11/1997 | Van Loo et al. | 395/470 |
| 5,699,500 A | 12/1997 | Dasgupta | 395/180 |

(List continued on next page.)

FOREIGN PATENT DOCUMENTS

WO    WO 00/01123    1/2000

OTHER PUBLICATIONS

Related U.S. patent application Ser. No. 09/672,454, filed Sep. 29, 2000.
Related U.S. patent application Ser. No. 09/739,667, filed Dec. 20, 2000.

*Primary Examiner*—Paul Kang
(74) *Attorney, Agent, or Firm*—Kenyon & Kenyon

(57) ABSTRACT

A method of sending messages from a node to a receiving agent. In one embodiment, if a outbound message that is stored in a buffer in the node is unsuccessfully sent to the receiving agent more than a threshold number of times, outbound messages currently stored in the buffer are sent to the receiving agent. It is determined that these outbound messages have been successfully sent before any other outbound messages are sent to the receiving agent. In a further embodiment, an outbound message is successfully sent if a success confirmation message is received for the outbound message from the receiving agent. In a still further embodiment, a retry response is received from the receiving agent for an outbound message if a buffer in the receiving agent that stores incoming outbound messages does not have room for the outbound message.

21 Claims, 3 Drawing Sheets

U.S. PATENT DOCUMENTS

| | | | |
|---|---|---|---|
| 5,701,313 A | 12/1997 | Purdham | 371/40.2 |
| 5,701,413 A | 12/1997 | Zulian et al. | 395/200.02 |
| 5,708,836 A | 1/1998 | Wilkinson et al. | 395/800 |
| 5,710,932 A | 1/1998 | Hamanaka et al. | 395/800 |
| 5,710,935 A | 1/1998 | Barker et al. | 395/800 |
| 5,713,037 A | 1/1998 | Wilkinson et al. | 395/800 |
| 5,717,942 A | 2/1998 | Haupt et al. | 395/800 |
| 5,717,943 A | 2/1998 | Barker et al. | 395/800 |
| 5,717,944 A | 2/1998 | Wilkinson et al. | 395/800 |
| 5,734,921 A | 3/1998 | Dapp et al. | 395/800.1 |
| 5,734,922 A | 3/1998 | Hagersten et al. | 395/800.37 |
| 5,742,510 A | 4/1998 | Rostoker et al. | 364/468.03 |
| 5,745,363 A | 4/1998 | Rostoker et al. | 364/468.28 |
| 5,748,900 A | 5/1998 | Scott et al. | 395/200.65 |
| 5,749,095 A | 5/1998 | Hagersten | 711/141 |
| 5,752,067 A | 5/1998 | Wilkinson et al. | 395/800.16 |
| 5,754,789 A | 5/1998 | Nowatzyk et al. | 395/200.63 |
| 5,754,871 A | 5/1998 | Wilkinson et al. | 395/800 |
| 5,754,877 A | 5/1998 | Hagersten et al. | 395/800.29 |
| 5,761,523 A | 6/1998 | Wilkinson et al. | 395/800.2 |
| 5,781,439 A | 7/1998 | Rostoker et al. | 364/468.28 |
| 5,781,551 A | 7/1998 | Born | 370/408 |
| 5,784,697 A | 7/1998 | Funk et al. | 711/170 |
| 5,787,094 A | 7/1998 | Cecchi et al. | 371/53 |
| 5,793,644 A | 8/1998 | Koford et al. | 364/491 |
| 5,794,059 A | 8/1998 | Barker et al. | 395/800.1 |
| 5,796,605 A | 8/1998 | Hagersten | 365/134 |
| 5,802,578 A | 9/1998 | Lovett | 711/147 |
| 5,805,839 A | 9/1998 | Singhal | 395/292 |
| 5,815,403 A | 9/1998 | Jones et al. | 364/489 |
| 5,842,031 A | 11/1998 | Barker et al. | 395/800 |
| 5,848,254 A | 12/1998 | Hagersten | 395/383 |
| 5,857,113 A | 1/1999 | Muegge et al. | 395/830 |
| 5,860,159 A | 1/1999 | Hagersten | 711/151 |
| 5,862,316 A | 1/1999 | Hagersten et al. | 395/182.13 |
| 5,864,738 A | 1/1999 | Kessler et al. | 395/200.69 |
| 5,867,649 A | 2/1999 | Larson | 395/200.31 |
| 5,870,313 A | 2/1999 | Boyle et al. | 364/491 |
| 5,870,619 A | 2/1999 | Wilkinson et al. | 395/800.2 |
| 5,875,117 A | 2/1999 | Jones et al. | 364/491 |
| 5,875,201 A | 2/1999 | Bauman et al. | 371/49.1 |
| 5,875,462 A | 2/1999 | Bauman et al. | 711/119 |
| 5,875,472 A | 2/1999 | Bauman et al. | 711/150 |
| 5,878,241 A | 3/1999 | Wilkinson et al. | 395/379 |
| 5,878,268 A | 3/1999 | Hagersten | 395/800.28 |
| 5,881,303 A | 3/1999 | Hagersten et al. | 395/800.3 |
| 5,887,138 A | 3/1999 | Hagersten et al. | 395/200.45 |
| 5,887,146 A | 3/1999 | Baxter et al. | 395/284 |
| 5,892,970 A | 4/1999 | Hagersten | 395/825 |
| 5,897,657 A | 4/1999 | Hagersten et al. | 711/145 |
| 5,900,020 A | 5/1999 | Safranek et al. | 711/167 |
| 5,903,461 A | 5/1999 | Rostoker et al. | 364/468.28 |
| 5,905,881 A | 5/1999 | Tran et al. | 395/395 |
| 5,905,998 A | 5/1999 | Ebrahim et al. | 711/144 |
| 5,911,052 A | 6/1999 | Singhal et al. | 395/293 |
| 5,914,887 A | 6/1999 | Scepanovic et al. | 364/491 |
| 5,922,063 A | 7/1999 | Olnowich et al. | 710/132 |
| 5,925,097 A | 7/1999 | Gopinath et al. | 709/200 |
| 5,931,938 A | 8/1999 | Drogichen et al. | 712/15 |
| 5,938,765 A | 8/1999 | Dove et al. | 713/1 |
| 5,941,967 A | 8/1999 | Zulian | 710/107 |
| 5,943,150 A | 8/1999 | Deri et al. | 359/133 |
| 5,946,710 A | 8/1999 | Bauman et al. | 711/129 |
| 5,950,226 A | 9/1999 | Hagersten et al. | 711/124 |
| 5,958,019 A | 9/1999 | Hagersten et al. | 709/400 |
| 5,960,455 A | 9/1999 | Bauman | 711/120 |
| 5,961,623 A | 10/1999 | James et al. | 710/113 |
| 5,963,745 A | 10/1999 | Collins et al. | 395/800.13 |
| 5,963,746 A | 10/1999 | Barker et al. | 395/800.2 |
| 5,963,975 A | 10/1999 | Boyle et al. | 711/147 |
| 5,964,886 A | 10/1999 | Slaughter et al. | 714/4 |
| 5,966,528 A | 10/1999 | Wilkinson et al. | 395/563 |
| 5,971,923 A | 10/1999 | Finger | 600/437 |
| 5,978,578 A | 11/1999 | Azarya et al. | 395/701 |
| 5,978,874 A | 11/1999 | Singhal et al. | 710/107 |
| 5,983,326 A | 11/1999 | Hagersten et al. | 711/147 |
| 5,999,734 A | 12/1999 | Willis et al. | 395/706 |
| 6,026,461 A | 2/2000 | Baxter et al. | 710/244 |
| 6,038,646 A | 3/2000 | Sproull | 711/158 |
| 6,038,651 A | 3/2000 | VanHuben et al. | 712/21 |
| 6,041,376 A | 3/2000 | Gilbert et al. | 710/108 |
| 6,049,845 A | 4/2000 | Bauman et al. | 710/113 |
| 6,049,853 A | 4/2000 | Kingsbury et al. | 711/147 |
| 6,052,760 A | 4/2000 | Bauman et al. | 711/119 |
| 6,055,617 A | 4/2000 | Kingsbury | 711/203 |
| 6,065,037 A | 5/2000 | Hitz et al. | 709/200 |
| 6,065,077 A | 5/2000 | Fu | 710/100 |
| 6,081,844 A | 6/2000 | Nowatzyk et al. | 709/233 |
| 6,085,295 A | 7/2000 | Ekanadham et al. | 711/145 |
| 6,092,136 A | 7/2000 | Luedtke | 710/107 |
| 6,092,156 A | 7/2000 | Schibinger et al. | 711/145 |
| 6,094,715 A | 7/2000 | Wilkinson et al. | 712/20 |
| 6,108,739 A | 8/2000 | James et al. | 710/113 |
| 6,119,215 A | 9/2000 | Key et al. | 712/19 |
| 6,141,733 A | 10/2000 | Arimilli et al. | 711/141 |
| 6,148,361 A | 11/2000 | Carpenter et al. | 710/260 |
| 6,155,725 A | 12/2000 | Scepanovic et al. | 395/500.1 |
| 6,161,191 A | 12/2000 | Slaughter et al. | 714/4 |
| 6,167,489 A | 12/2000 | Bauman et al. | 711/145 |
| 6,171,244 B1 | 1/2001 | Finger et al. | 600/437 |
| 6,173,386 B1 | 1/2001 | Key et al. | 712/10 |
| 6,173,413 B1 | 1/2001 | Slaughter et al. | 714/6 |
| 6,182,112 B1 | 1/2001 | Malek et al. | 709/201 |
| 6,189,078 B1 | 2/2001 | Bauman et al. | 711/156 |
| 6,189,111 B1 | 2/2001 | Alexander et al. | 714/8 |
| 6,192,452 B1 | 2/2001 | Bannister et al. | |
| 6,199,135 B1 | 3/2001 | Maahs et al. | 710/129 |
| 6,199,144 B1 | 3/2001 | Arora et al. | 711/145 |
| 6,205,528 B1 | 3/2001 | Kingsbury et al. | 711/170 |
| 6,209,064 B1 | 3/2001 | Weber | 711/141 |
| 6,212,610 B1 | 4/2001 | Weber et al. | 711/164 |
| 6,226,714 B1 | 5/2001 | Safranek et al. | 711/119 |
| 6,226,718 B1 | 5/2001 | Carpenter et al. | |
| 6,269,428 B1 | 7/2001 | Carpenter et al. | |
| 6,279,085 B1 | 8/2001 | Carpenter et al. | |
| 6,640,325 B1 * | 10/2003 | Fischer | 709/232 |

* cited by examiner

METHOD AND APPARATUS FOR PREVENTING STARVATION IN A MULTI-NODE ARCHITECTURE

FIELD OF THE INVENTION

Embodiments of the present invention relate to a computer system having a multi-node computer architecture. In particular, the present invention relates to a method and apparatus for managing the sending of inter-node messages in a multi-node architecture.

BACKGROUND

Computer systems may contain multiple processors that may work together to perform a task. For example, a computer system may contain four processors that may share system resources (e.g., input devices or memory devices) and may perform parallel processing. The processors may send messages to each other, may send messages to system resources, and may send and receive messages from the system resources (e.g., a memory or output device). For example, such messages may include requests for information that is stored at a memory location in a memory device.

In some systems, the messages are sent from a processor to another component of the system over an interconnect. For various reasons, a message that is sent by a processor may not be received by the destination component. For example, the destination component may not have the capacity to accept the message at that time. Where the sending of a message failed, the processor that sent the message may receive a failure message or may simply not receive an acknowledgment message within a defined waiting period. The message may be in a starvation situation if the message sending fails indefinitely due to the conditions of the system (e.g., the amount of other traffic being directed at the receiving component). In some systems, the processor that is sending the message may alleviate such a starvation condition by taking control of the interconnect until the message is successfully sent.

DETAILED DESCRIPTION

Figure 1:
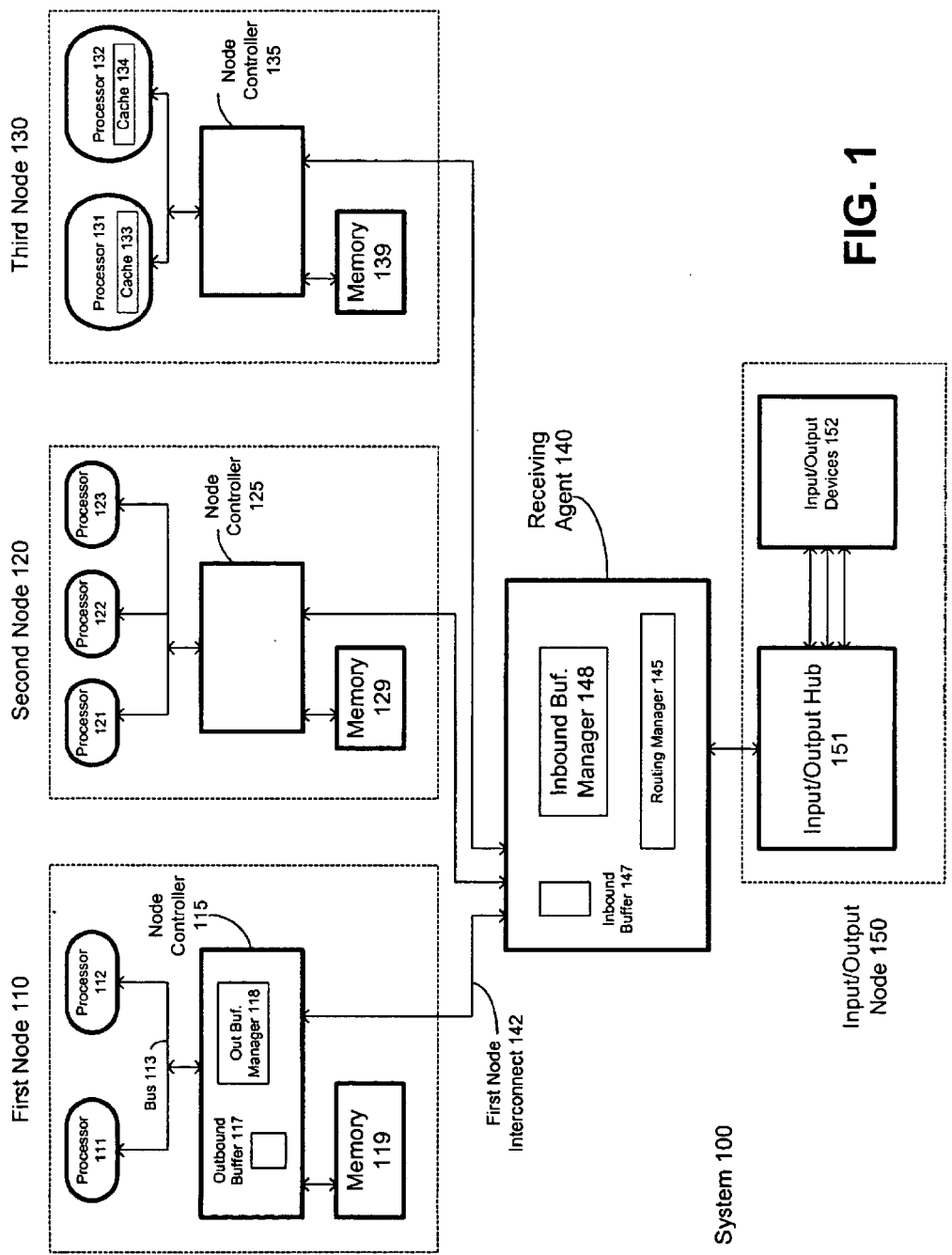
FIG. 1 is a partial block diagram of a system having a node that sends messages according to an embodiment of the present invention.

Embodiments of the present invention relate to methods and apparatus of sending messages from a node in a multi-node system to a receiving agent. FIG. 1 is a partial block diagram of a system having a node that sends messages according to an embodiment of the present invention. FIG. 1 shows a system 100 which is a computer system that includes processors, memory devices, and input/output devices. Components in system 100 are arranged into architectural units that are referred to herein as nodes. Each node may contain one or more processors, memories, or input/output devices. In addition, the components within a node may be connected to other components in that node though one or more busses or lines. Each node in system 100 has a node connection that may be used by the components within that node to communicate with components in other nodes. In one embodiment, the node connection for a particular node is used for any communication from a component within that node to another node. In system 100, the node connection for each node is connected to a receiving agent 140. A system that has multiple nodes is referred to as a multi-node system. A multi-node system for which each node communicates to other nodes though a dedicated connection may be said to have a point-to-point architecture.

The nodes in system 100 may send messages (e.g., a request to read from a memory) that are directed to a processor or resource in another node. For various reasons, the intended recipient of a message may not be able to process the message or may not receive the message. For example, the recipient of a message may not have room to store a message that it receives. If the sending of the message is not successful, the sending node may retry sending the message. In an embodiment of the present invention, after a sending node determines that a message has been unsuccessfully sent to a receiving agent more than a threshold number of times, the sending node ensures that the message is successfully sent before accepting any new messages to be sent. Use of this embodiment may reduce the length of time which a message waits to be sent and received successfully.

As shown in FIG. 1, system 100 includes a first node 110, a second node 120, a third node 130, and an input/output node 150. Each of these nodes is coupled to receiving agent 140. The term "coupled" encompasses a direct connection, an indirect connection, an indirect communication, etc. First node 110 is coupled to receiving agent 140 through first node interconnect 142. First node interconnect 142 may be one or more lines capable of communicating information to and from the first node.

First node 110 includes processor 111, processor 112, and node controller 115, which are coupled to each other by bus 113. Processor 111 and processor 112 may be any microprocessors that are capable of processing instructions, such as for example a processor in the INTEL PENTIUM family of processors. Bus 113 may be a shared bus. First node 10 also contains a memory 119 which is coupled to node controller 115. Memory 119 may be a Random Access Memory (RAM). Node controller 115 contains an outbound buffer 117 and an outbound buffer manager 118. Outbound buffer 117 may be a memory or part of a memory which stores outbound messages that are generated by a processor, such as processor 111 or processor 112, and are to be sent out from node 110 to another node in system 100. Outbound buffer manager 118 may contain logic that manages the sending of outbound messages that are stored in outbound buffer 117. For example, outbound buffer manager 118 may be an application specific integrated circuit. As used in this application, "logic" may include hardware logic, such as circuits that are wired to perform operations, or program logic, such as firmware that performs operations.

Similarly, second node 120 contains a processor 121, processor 122, processor 123, and node controller 125, each of which is coupled to each other. Second node 120 also contains a memory 129 that is coupled to node controller 125. Third node 130 contains a processor 131, processor 132, and node controller 135 that are coupled to each other. Third node 130 also contains a memory 139 that is coupled to node controller 135. Processors 121, 122, 123, 131, and 132 may be similar to processors 111 and 112. In an embodiment, two or more of processors 111, 112, 121, 122, 123, 131, and 132 are capable of processing a program in parallel. Node controllers 125 and 135 may be similar to node controller 115, and memory 129 and 139 may be similar to memory 119. Processor 131 may contain a cache 133, and processor 132 may contain a cache 134. Cache 133 and cache 134 may be Level 2 (L2) cache memories that are comprised of Static Random Access Memory (SRAM).

In one embodiment, receiving agent 140 may be a routing switch for routing messages within system 100. Receiving agent 140 contains an inbound buffer 147, an outbound buffer 148, and a routing manager 145. Inbound buffer 147 may be a memory, or part of a memory, which stores outbound messages that are received by receiving agent 140. Inbound buffer manager 148 may contain logic that manages the receiving of outbound messages that are stored in inbound buffer 117. Routing agent 145 may contain logic that routes messages received by receiving agent 140 to the appropriate destination node or nodes. Inbound buffer manager 148 and routing manager 145 may be, for example, parts of the same application specific integrated circuit.

Input/output node 150 contains an input/output hub 151 that is coupled to one or more input/output devices 152. Input/output devices 152 may be, for example, any combination of one or more of a printer, keyboard, mouse, or any other input/output device. Input/output hub 151 may by an integrated circuit that contains bus interface logic for interfacing with a bus that complies to the Peripheral Component Interconnect standard. Input/output hub 150 may be similar to, for example, the INTEL 82801AA I/O Controller Hub.

In an embodiment, node controller 115, receiving agent 140, and input/output hub 151 may be a chipset the provides the core functionality of a motherboard, such as a modified version of a chipset in the INTEL 815 family of chipsets In an embodiment of the present invention, the processors in nodes 110, 120 and 130 may be shared memory multiprocessors, and each of the memories 119, 129, and 139 may be part of the same shared physical address space. In a further embodiment, the processors in nodes 110, 120, and 130 communicate with each other through shared memory reads and writes (i.e., by writing to and reading from memory 119, 129 and 139). In a further embodiment, the processors in nodes 110, 120 and 130 each have one or more caches (e.g., Level 1 and Level 2 caches), and these caches are kept coherent using the receiving agent 140. For example, when processor 111 accesses a location in memory 119, it may send a snoop request for that memory location to receiving agent 140, which may determine if any of the processors in second node 120 and third node 130 have cached that memory location. A snoop request may be generated when a processor needs other processors in the system to look in their own caches to see if a particular line is present in their cache.

In a further embodiment, inter-node communication in system 100 is asynchronous (i.e., there is no fixed timing between events). In a still further embodiment, inter-node communication is sent in the form of packets which may contain a header or a header and data sections.

An example of a message size may be 144 bits. In an embodiment, the messages sent may include requests and responses. In a further embodiment, the types of requests that the nodes may send and receive may include a memory read request, memory write request, cache snoop request, cache flush request, memory update request, cache line replacement request, input/output port read request, and input/output port write request. Requests may contain fields such as a packet type, destination ID, request type, source ID, transaction address, request length, stream ID, and ordering semantics.

Figure 2:
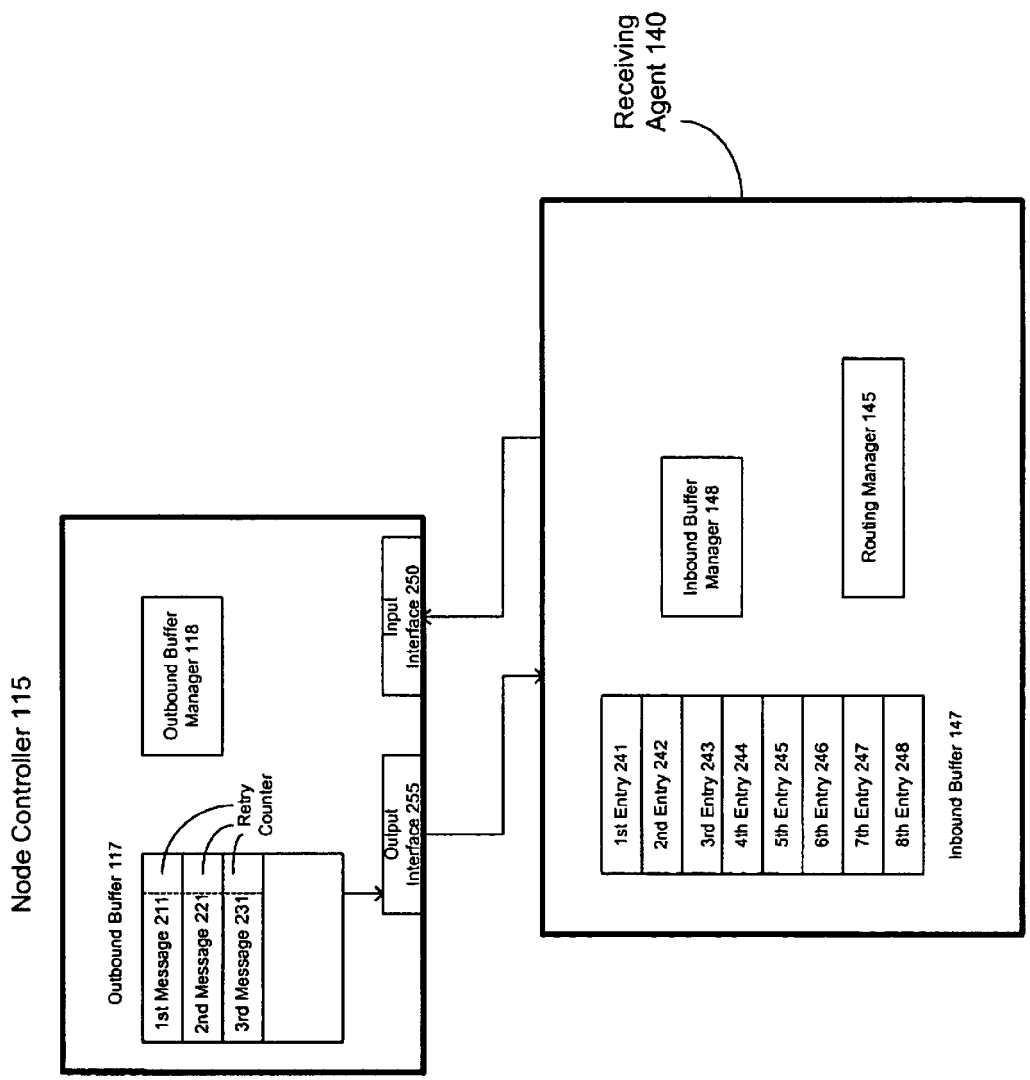
FIG. 2 is a partial block diagram showing more details of a node controller and receiving agent according to an embodiment of the present invention.

FIG. 2 is a partial block diagram showing more details of a node controller and receiving agent according to an embodiment of the present invention. In particular, FIG. 2 shows more details of the node controller 115 and receiving agent 140 of FIG. 1. As shown in FIG. 2, output buffer 117 in node controller 115 contains a first message 211, second message 221, and third message 231. In one embodiment, output buffer 117 has the capacity to contain 32 outbound messages. In an embodiment, each outbound message that is stored in output buffer 117 contains a retry counter. In a further embodiment, the retry counter for each outbound message is four bits long, in which case it is capable of counting from 0 to 15. In addition to output buffer manager 118, node controller 115 also contains an input interface 250 and an output interface 255. Output interface 255 is coupled to outbound buffer 117 and is used to send outbound messages from node controller 115 to receiving agent 140. Input interface 250 is used to receive messages from receiving agent 140.

Receiving agent 140 contains inbound buffer 147, inbound buffer manager 148, and routing manager 145 as discussed above. As shown in FIG. 2, inbound buffer 147 contains entries that may be used to store an outbound message after it is received from node controller 115. In one embodiment, each entry in inbound buffer 147 is large enough to store one outbound message that is received from a node. In a further embodiment, inbound buffer 147 contains eight entries. In another embodiment, inbound buffer 147 has 32 entries.

Figure 3:
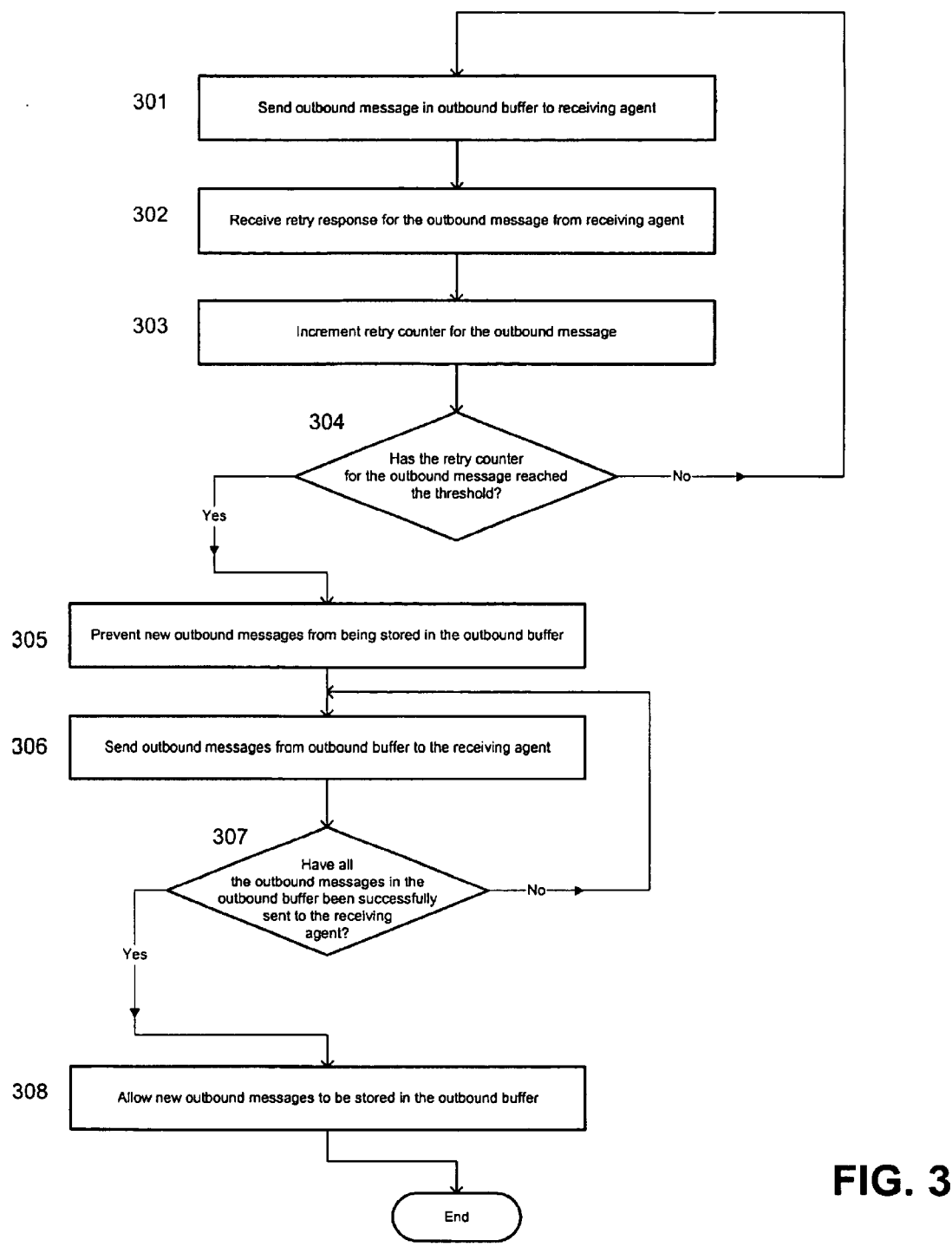
FIG. 3 is a flow diagram of a method of sending messages according to an embodiment of the present invention.

FIG. 3 is a flow diagram of a method of sending outbound messages according to an embodiment of the present invention. In an embodiment, throughout the operation of the system the node controller in a node receives outbound messages from the processors in that node. For example, node controller 115 may receive outbound messages from processors 111 and 112. The outbound message may be a memory related outbound message, such as a request for data stored in a memory location in a memory in another node, such as memory 129. As another example, the outbound message may be related to snooping a cache memory that is part of a second node. In an embodiment, the node controller stores outbound messages which it receives and are destined for another node in an outbound buffer, such as buffer 117. In the embodiment shown in FIG. 3, the node controller sends the outbound messages one-by-one (301) to a receiving agent over the interconnect that connects the node to the rest of the system. The outbound messages may be selected from the buffer for sending using any selection algorithm, such as a first-in-first-out (FIFO) algorithm. The receiving agent may be the destination node, such as for example in a two-node system, or may be a switch, such as receiving agent 140 in FIG. 1. In one embodiment, the outbound message is sent in a packet format.

In an embodiment, the sending of outbound messages is asynchronous. In a further embodiment, new outbound messages that need to be sent may be received by the node controller while outbound messages are being sent out by the node controller. That is, the node controller may store new outbound messages in the outbound buffer while it is sending outbound messages from the outbound buffer to the receiving agent. In an embodiment, because the outbound message may be unsuccessfully sent to the receiving agent, the outbound messages in the outbound buffer of the sending node remain in the buffer after they have been sent to the receiving agent. According to this embodiment, an outbound message may be removed from the outbound buffer after it has been determined that the message has been successfully sent to the receiving agent. In this embodiment, each outbound message that is stored in the outbound buffer may have a sent flag that is set after the outbound message has been sent, and is unset if it is later determined that the sending was unsuccessful. In a further embodiment, an outbound message may be selected for sending only if its sent flag is set.

According to the embodiment shown in FIG. 3, the node that sent the outbound message receives a retry response for the outbound message from the receiving agent (302). The retry response may be sent, for example, if an inbound buffer in the receiving agent does not have room to store the outbound message that was sent by the sending node. Every entry in the inbound buffer may contain an outbound message that was received but has yet to be processed or otherwise transferred to another node, and thus the inbound buffer may not have any free locations which can be used to store new outbound messages. If the inbound buffer does have room to store the outbound message, the receiving agent may send a confirmation message to the sending node after it receives the outbound message and stores it in the inbound buffer. In an embodiment, an outbound message is considered to be successfully sent if a success confirmation message is received for the outbound message from the receiving agent, and an outbound message is considered to be unsuccessfully sent if a retry response is received for the outbound message from the receiving agent.

In an embodiment, when the sending node receives a retry response for a outbound message which is stored in its outbound buffer, it increments a retry counter that is associated with the outbound message (303). A determination is made whether a threshold number of retry responses have been received for this outbound message (304). In one embodiment, the threshold number of retry responses is sixteen retry responses. Of course, a smaller or larger threshold may be used. If the retry counter has not reached the threshold, the node controller may continue sending outbound messages as discussed above. If the retry counter has reached the threshold, the node controller may determine that all of the outbound messages that are in the buffer have been successfully sent before any other outbound messages are sent to the receiving agent. The node controller may prevent any new entries from being stored in the outbound buffer until all outbound messages currently stored in the outbound buffer have been both sent to a receiving agent and stored in an inbound buffer in the receiving agent.

In the embodiment shown in FIG. 3, when it is determined that the retry counter has reached the threshold, the node controller prevents any new outbound messages from being stored in the outbound buffer (305). The node controller then sends outbound messages from the outbound buffer to the receiving agent (306). The node controller determines whether all of the outbound messages in the outbound buffer have been successfully received by the receiving agent (307), and continues to send the outbound messages stored in the outbound buffer until all the outbound messages have been successfully sent. As discussed above, a outbound message may be considered to be successfully sent when a confirmation message is received from the receiving agent for the outbound message. After all the outbound messages in the outbound buffer have been successfully sent, the node controller may allow new entries to be stored in the outbound buffer (308).

In a further embodiment, after receiving a successfully sent outbound message the receiving agent identifies a second node in the multi-node system that is capable of processing the successfully sent outbound message and sends the successfully sent outbound message to the second node.

The present invention may reduce the length of time which an outbound message waits in the outbound buffer to be sent and received successfully. In certain cases, a starvation situation may arise, and an outbound message waiting in the outbound buffer may continually have to be resent to the receiving agent. For example, when the outbound message is sent, the inbound buffer in the receiving agent may be full, and the receiving agent may send a retry response to the node controller. Before the node controller can resend the message, free entries may become available in the inbound buffer but this room may be filled up with other messages that have been sent by the node controller in the interim. In this case, the resent outbound message will again result in a retry response. This sequence may repeat itself indefinitely. This problem may occur, for example, where the messages are sent asynchronously. When the method and apparatus of the present invention are employed, after a particular outbound message has been retried a threshold number of times, the node controller will limit the set of outbound messages sent to those that are currently in the outbound buffer. The number of outbound messages that can fill the inbound buffer in the receiving agent will be quickly be reduced each time a new outbound message is successfully received. Thus, when the present invention is used, the amount of time is limited that any outbound message will stave due to lack of space of the inbound buffer.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, while the nodes in FIG. 1 are shown containing two/three processors, a node may contain any number of processors. In one embodiment, a node contains only one processor, and in another embodiment a node contains sixteen processors. As another example, while the nodes in FIG. 1 are connected through receiving agent 140, in another embodiment two nodes may be directly connected to each other. For example, in a system with that has two nodes, the node controller of a first node may be connected to the node controller of a second node. In another embodiment, the node controller for a node may be part of a processor in that node. For example, a first node in a system may only contain one processor, and the node controller for that node may be part of that processor. In addition, a node (e.g., node 110) may contain one or processors and an input/output hub. In still another embodiment, the outbound buffer manager, inbound buffer manager, and/or routing manager are implemented as instructions adapted to be executed by a processor, which may include firmware, microcode, object code, source code, ext.

We claim:

1. A method of sending messages, the method comprising:

determining that an outbound message stored in a buffer has been unsuccessfully sent to a receiving agent more than a threshold number of times, wherein the buffer both stores an outbound message that has not yet been sent to the receiving agent and stores said unsuccessfully sent outbound message;

sending the receiving agent all outbound messages currently stored in the buffer; and determining that all of said outbound messages have been successfully sent before any other outbound messages are sent to the receiving agent.

2. The method of claim 1, wherein an outbound message is successfully sent if a success confirmation message is received for the outbound message from the receiving agent, and wherein an outbound message is unsuccessfully sent if a retry response is received for the outbound message from the receiving agent.

3. The method of claim 2, wherein a retry response is received from the receiving agent for an outbound message if a buffer in the receiving agent that stores incoming messages does not have room for the outbound message.

4. The method of claim 1, wherein after receiving a successfully sent outbound message the receiving agent:

identifies a second node in the multi-node system that is capable of processing the successfully sent outbound message; and sends the successfully sent outbound message to the second node.

5. The method of claim 1, wherein the outbound message is sent in a packet format.

6. A method of sending messages in a multi-node system, the method comprising:

receiving a retry response for a previously sent outbound message that is stored in an outbound buffer in a first node of a multi-node system, wherein the outbound buffer both stores an outbound message that has not yet been sent to the receiving agent and stores said previously sent outbound message;

determining that a threshold number of retry responses have been received for said previously sent outbound message; and preventing any new entries from being stored in the outbound buffer until all outbound messages currently stored in the outbound buffer have been both sent to a receiving agent and stored in an inbound buffer in the receiving agent.

7. The method of claim 6, wherein a retry response is received for the outbound message if the outbound message was sent to the receiving agent and there were no free locations in the inbound buffer in which to store the outbound message.

8. The method of claim 6, wherein said determining that a threshold number of retry responses have been received includes:

incrementing a retry counter associated with the outbound message; and determining that the retry counter has reached a threshold.

9. The method of claim 6, wherein the outbound message is a memory related outbound message.

10. The method of claim 9, wherein the outbound message relates to snooping a cache memory that is part of a second node of the multi-node system.

11. A node controller comprising:

a buffer to store a plurality of outbound messages, wherein the buffer is to both store an outbound message that has not yet been sent and store an outbound message that was previously sent;

an output interface coupled to the buffer to send outbound messages from the node controller;

an input interface to receive retry responses; and a buffer manager coupled to the input interface and having logic to determine that a threshold number of retry responses have been received for an outbound message that is stored in the buffer.

12. The node controller of claim 11, wherein each outbound message in the buffer has a retry counter, wherein the buffer manager has logic to increment the retry counter for an outbound message each time that a retry response is received for the outbound message, and wherein the buffer manager has logic to use the retry counter to determine that a threshold number of retry responses have been received.

13. The node controller of claim 11, wherein the buffer manager further comprises logic to prevent any outbound messages not currently stored in buffer from being sent until the successful sending of all outbound messages currently stored in the buffer has been confirmed.

14. The node controller of claim 12, wherein said logic to prevent any outbound messages from being sent includes logic to prevent the storage of new outbound messages in the buffer.

15. A system comprising:

a first node having a node controller that includes:

an outbound buffer to store a plurality of outbound messages, wherein the buffer is to both store an outbound message that has not yet been sent and store an outbound message that was previously sent; and an outbound buffer manager to prevent the storage of new outbound messages in the outbound buffer when a threshold number of retry responses has been received for a outbound message stored in the outbound buffer; and a receiving agent coupled to said first node and including:

an inbound buffer to store a plurality of outbound messages; and an inbound buffer manager to send a retry response to the first node if an outbound message is received from the first node and there are no free entries in the inbound buffer in which to store the outbound message.

16. The system of claim 15, wherein each outbound message stored in the inbound buffer has a retry counter, and wherein the inbound buffer manager contains logic to increment the retry counter for an outbound message each time a retry response is received for the outbound message.

17. The system of claim 16, wherein the outbound buffer manager further contains logic to prevent the storage of new outbound messages in the outbound buffer when the retry counter for an outbound message has reached a threshold.

18. The system of claim 15, wherein the first node further comprises a first processor that sends outbound messages to the node controller.

19. The system of claim 15, wherein the system further comprises a second node, and wherein the receiving agent further includes a routing manager to route outbound messages from the first node to the second node.

20. An article of manufacture comprising a computer-readable medium having stored thereon instructions adapted to be executed by a processor, the instructions which, when executed, cause the processor to manage outbound message sending by:

sending to a receiving agent a first outbound message that is stored in an outbound buffer in a node of a multi-node system, wherein the outbound buffer both stores an outbound message that has not yet been sent and stores said first outbound message;

receiving a retry response for the first outbound message;

determining that a threshold number of retry responses have been received for the first outbound message; and preventing any new entries from being stored in the outbound buffer until all outbound messages currently stored in the outbound buffer have been both sent to the receiving agent and stored in an inbound buffer in the receiving agent.

21. The article of manufacture of claim 20, wherein the instructions for determining that a threshold number of retry responses have been received includes instructions to:

increment a retry counter associated with the outbound message; and determine that the retry counter has reached a threshold.

* * * * *